(12) United States Patent
Lu

(10) Patent No.: US 6,679,245 B1
(45) Date of Patent: Jan. 20, 2004

(54) BROILER FRAME

(76) Inventor: Chien-Chang Lu, No. 128, Te-Yang Road, Hou-Pi Tsun, Jen-Te Hsiang, Tainan Hsien (TW)

( * ) Notice: Subject to any disclaimer, the term of this patent is extended or adjusted under 35 U.S.C. 154(b) by 0 days.

(21) Appl. No.: 10/190,591

(22) Filed: Jul. 9, 2002

(51) Int. Cl.[7] .............................. F24C 5/00; F24C 15/30
(52) U.S. Cl. ...................... 126/25 R; 126/305; 126/50
(58) Field of Search ................ 126/25 R, 305, 126/50, 9 R, 41 R, 41 D, 41 B, 26, 30, 40; 248/146, 152, 125.8, 188

(56) References Cited

U.S. PATENT DOCUMENTS

| | | | | |
|---|---|---|---|---|
| 781,977 A | * | 2/1905 | Wentworth | 248/125.8 |
| 891,479 A | * | 6/1908 | Howe | 248/185.1 |
| 3,498,210 A | * | 3/1970 | O'Toole | 99/357 |
| 4,724,753 A | * | 2/1988 | Neyman et al. | 99/339 |
| 4,836,480 A | * | 6/1989 | Besner | 248/125.3 |
| 5,458,305 A | * | 10/1995 | Woodward | 248/121 |
| 5,819,720 A | * | 10/1998 | Schubert | 126/41 R |
| 5,893,357 A | * | 4/1999 | Royer et al. | 126/9 R |

* cited by examiner

*Primary Examiner*—Alfred Basichas

(57) ABSTRACT

A broiler frame includes a broiler oven and a telescopic foot frame. The broiler oven is fixed with a securing rod under the bottom. The telescopic foot frame for the broiler oven to be rotatably mounted thereon is composed of a collapsible foot frame and a telescopic tube. The collapsible foot frame consists of a sleeve and a set of support tripod. The sleeve is provided with a position bolt and receives the telescopic tube in the interior. The securing rod of the broiler oven is rotatably inserted in the upper end of the telescopic tube. Thus, the broiler oven can be turned around for 360° in using, and the telescopic foot frame can be adjusted to a height suitable for a user to carry out broiling conveniently.

1 Claim, 5 Drawing Sheets

BROILER FRAME

BACKGROUND OF THE INVENTION

1. Field of the Invention

This invention relates to a broiler frame, particularly to one having a broiler oven fixed under the bottom with a securing rod to be rotatably mounted on a telescopic foot frame, and the telescopic foot frame composed of a collapsible foot frame and a telescopic tube. The collapsible foot frame consists of a sleeve and a set of support tripod. The sleeve is provided with a position bolt at an upper end and receives the telescopic tube in the interior, with the securing rod of the broiler oven rotatably inserted in the upper end of the telescopic tube, enabling the broiler oven to turn around for 360° in using and to be adjusted to a height convenient for broiling.

2. Description of the Prior Art

A conventional broiler frame 1, as shown in FIG. 1, includes a broiler oven 10 having a broiling net 11 provided on the topside and a pair of foot frames 12 fixed under the bottom. However, such a conventional broiler frame 1 is stationary, impossible to be collapsed when it is unused, and if the conventional broiler frame 1 is assembled by means of bolts. These bolts have to be unscrewed one by one before the broiler frame 1 is disassembled for storing, thus taking much time and resulting in much inconvenience. To sum up, a conventional broiler frame takes too much space for storing and is impossible to be adjusted in height.

SUMMARY OF THE INVENTION

The objective of the invention is to offer a broiler frame able to be adjusted in height for broiling conveniently and collapsed quickly for carrying about easily.

Another objective of the invention is to offer a broiler frame able to be turned around for 360°.

Still another objective of the invention is to offer a broiler frame able to be collapsed quickly to diminish its size for storing with only a little space.

The feature of the invention is a broiler oven having a securing rod fixedly provided under the bottom and a telescopic foot frame composed of a collapsible foot frame and a telescopic tube. The collapsible foot frame consists of a sleeve and a set of support tripod, the sleeve is provided with a position bolt at an upper side, the telescopic tube inserted in the sleeve of the collapsible foot frame, and the securing rod of the broiler oven is rotatably inserted in the upper end of the telescopic tube.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
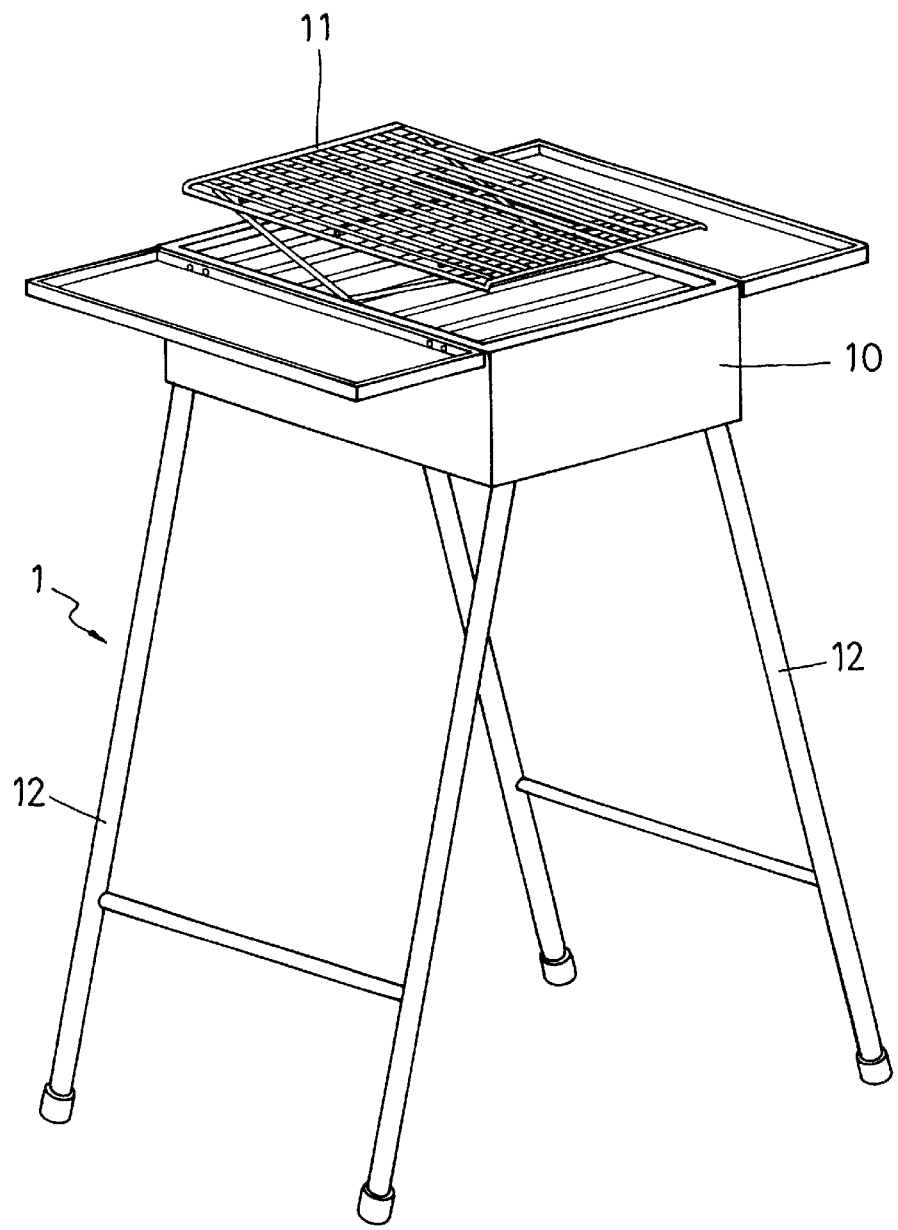
FIG. 1 is a perspective view of a conventional broiler frame.
Figure 2:
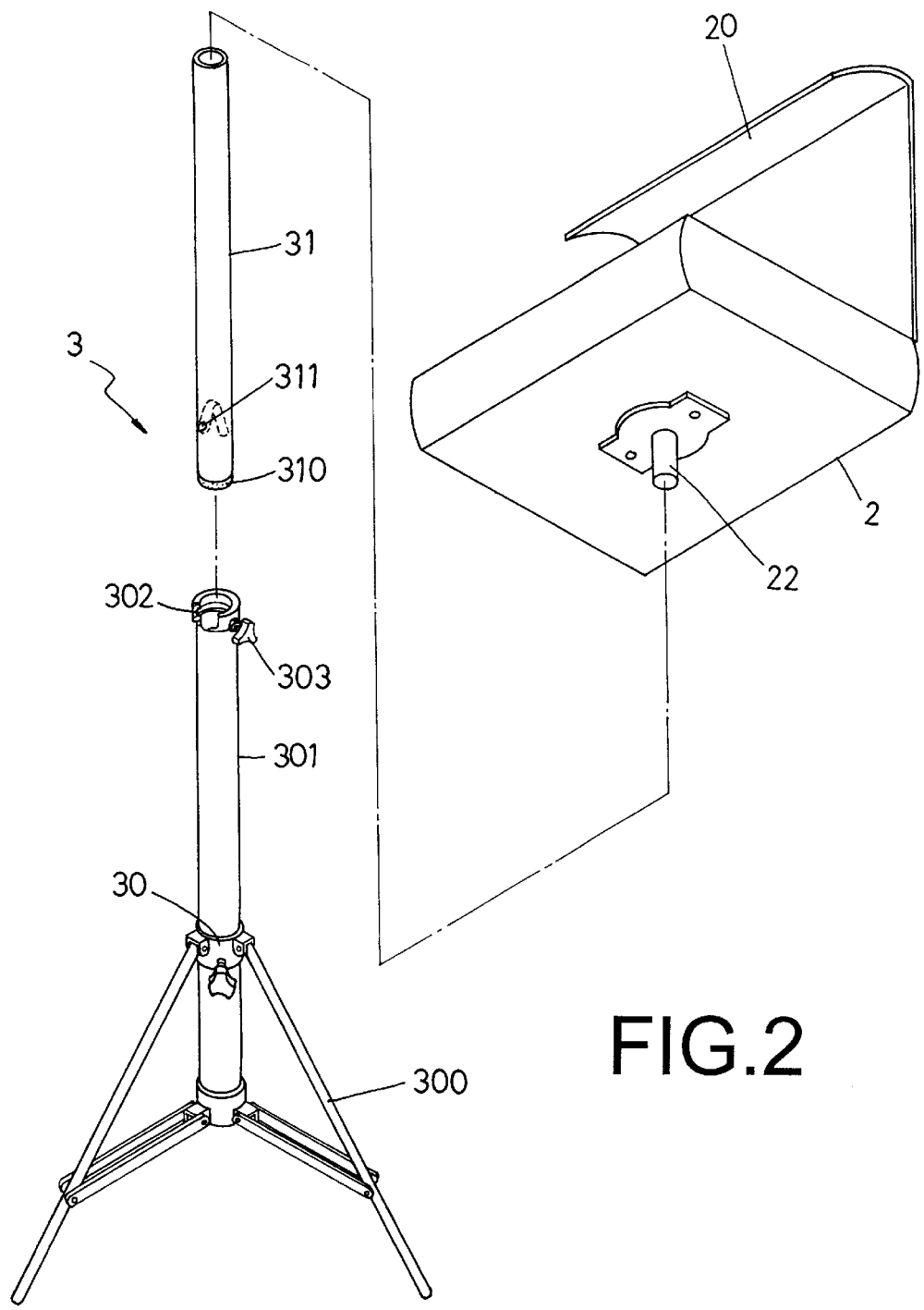
FIG. 2 is an exploded perspective view of a broiler frame in the present invention.
Figure 3:
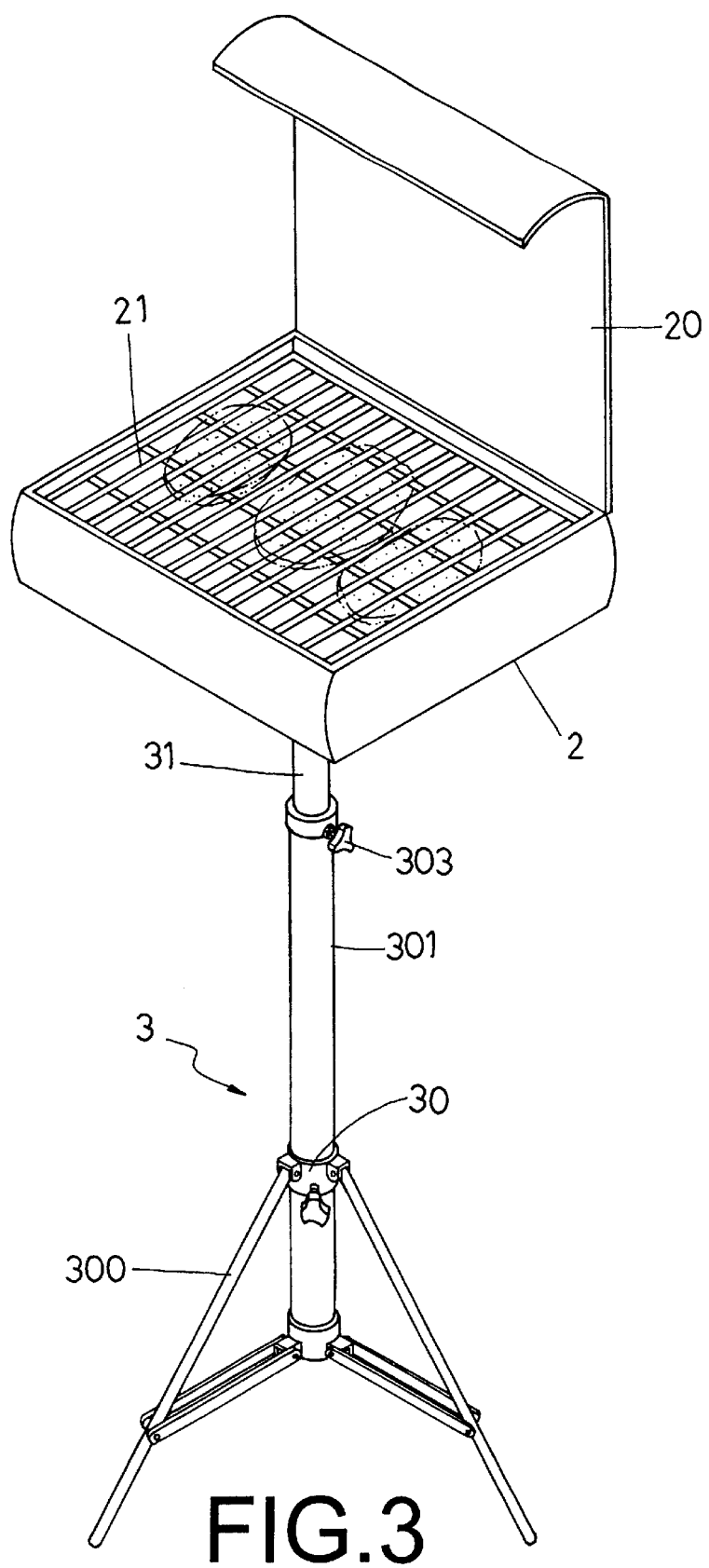
FIG. 3 is a perspective view of the broiler frame in a used condition in the present invention.
Figure 4:
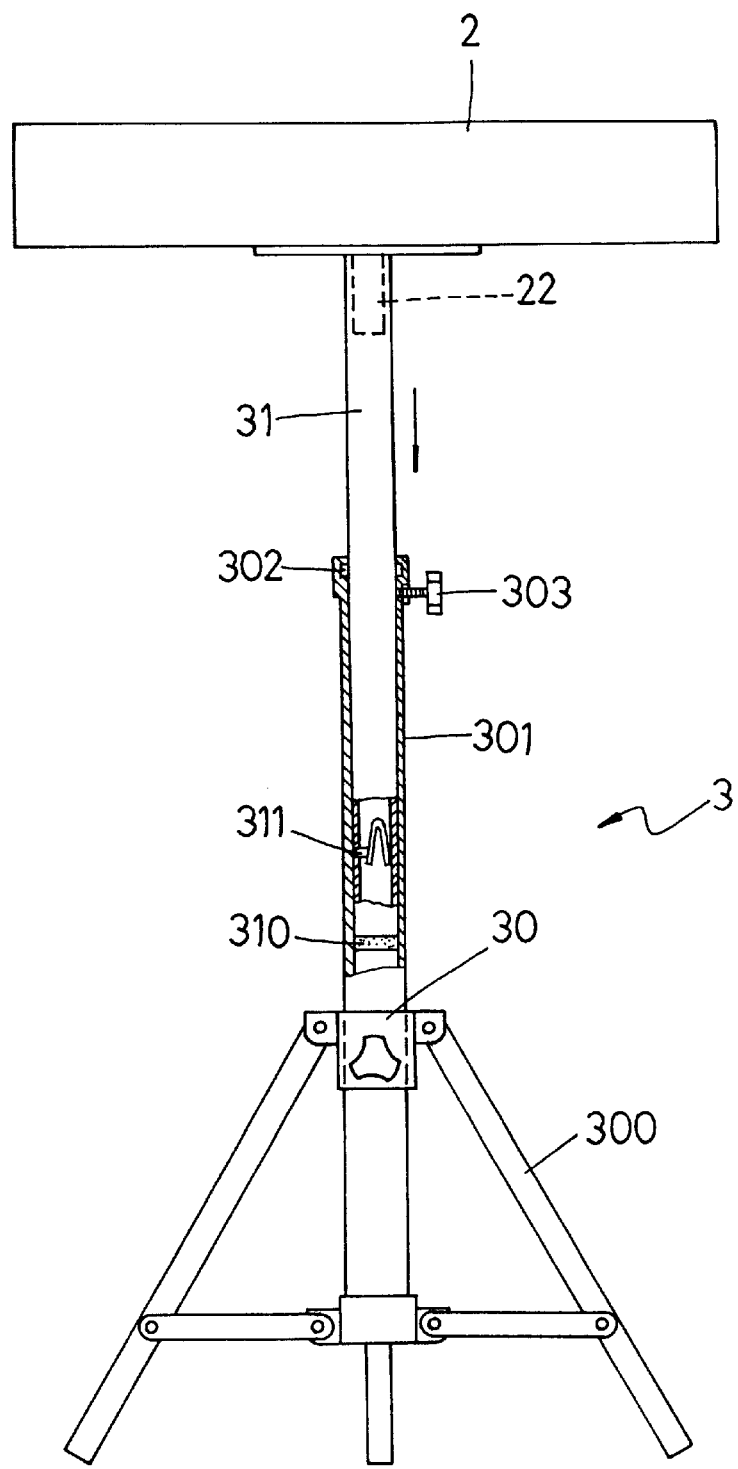
FIG. 4 is a cross-sectional view of the broiler frame with its telescopic foot frame to be adjusted in height in the present invention; and, FIG. 5 is a cross-sectional view of the broiler frame having its telescopic foot frame adjusted in height in the present invention.

A preferred embodiment of a broiler frame in the present invention, as shown in FIGS. 2 and 3, includes a broiler oven 2 and a telescopic foot frame 3 combined together.

The broiler oven 2 has a cover plate 20 pivotally assembled on top, a net frame 21 provided inside and a securing rod 22 secured under the center bottom.

Figure 5:
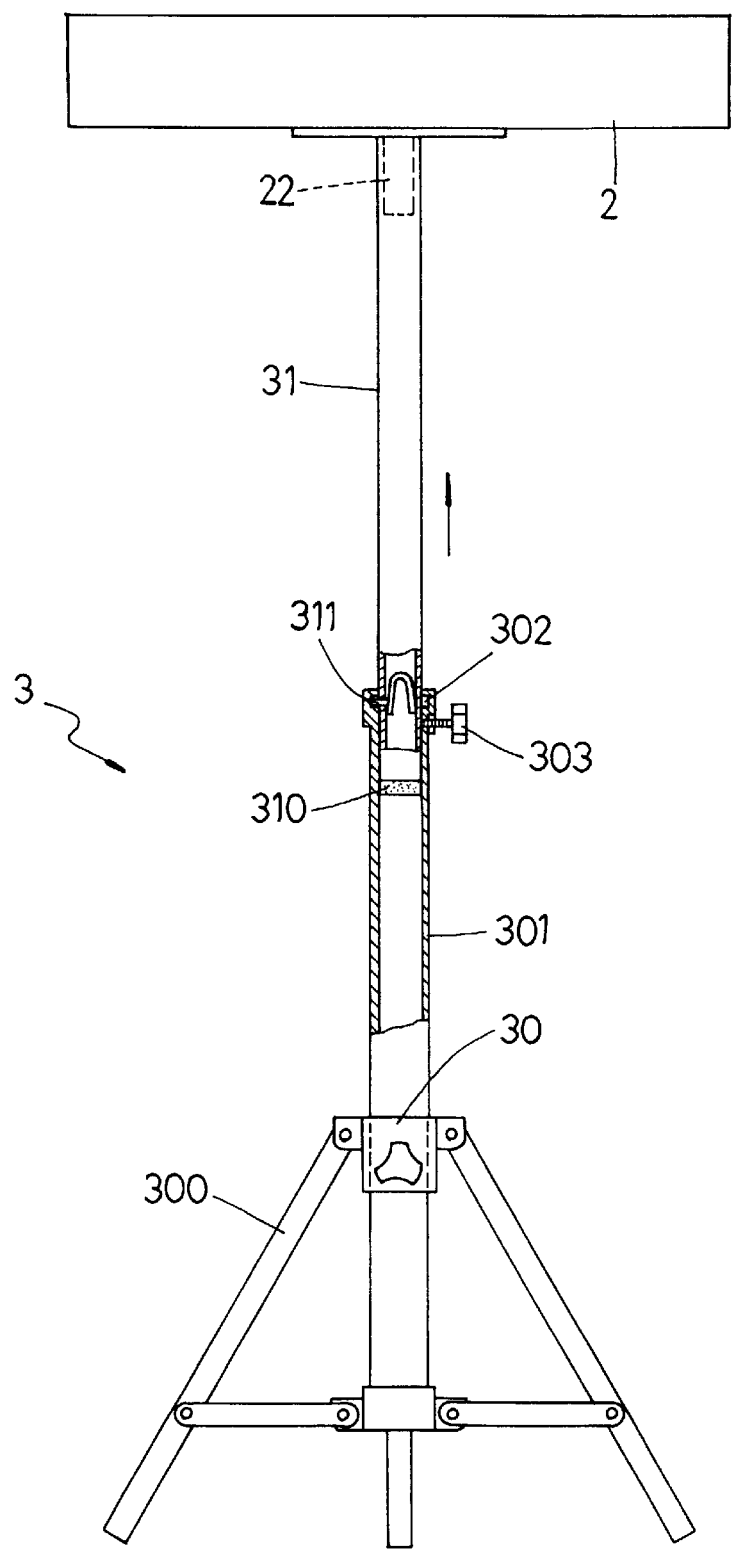

The telescopic foot frame 3 for the broiler oven 2 to be rotatably mounted thereon consists of a collapsible foot frame 30 and a telescopic tube 31. The collapsible foot frame 30 is composed of a set of support tripod 300 pivotally connected together and a sleeve 301. The sleeve 301 is formed with an annular groove 302 in the upper inner wall, and a position bolt 303 provided at one side. The telescopic tube 31 is inserted in the sleeve 301 of the collapsible foot frame 30, having its upper end rotatably inserted in with the securing rod 22 of the broiler oven 2. The telescopic tube 31 is provided with a buffer gasket 310 around the lower end and an elastic stopper 311 at a proper location of its inner wall. The elastic stopper 311 is positioned in the interior of the telescopic tube 31 but has its opposite ends protruding out of the wall of the telescopic tube 31 to engage with the annular groove 302 in the upper inner wall of the sleeve 301, as shown in FIG. 5, so as to prevent the telescopic tube 31 from slipping out of the sleeve 301 by a force applied improperly and hence protect the broiler oven 2 and the food on it from dropping down.

In assembling and using, as shown in FIGS. 2, 3, 4 and 5, the telescopic tube 31 of the telescopic foot frame 3 has its lower end with the buffer gasket 310 first inserted in the sleeve 301 and the securing rod 22 of the broiler oven 2 inserted in its upper end movably. At this time, the telescopic tube 31 is pressed by gravity of the broiler oven 2 to move downward slowly along the sleeve 301 with help of its buffer gasket 310, and when the broiler oven 2 together with the telescopic tube 31 moves downward to a proper location, it can be fixed in place at an anticipated height only by screwing inward the position bolt 303 of the sleeve 301 to tightly press against the telescopic tube 31 inside the sleeve 301.

On the contrary, to move the broiler oven 2 upward to a certain height wanted, simply unscrew the bolt 303 and pull upward the telescopic tube 31 to a needed height, and once more tightly screw the bolt 303.

In addition, the elastic stopper 311 of the telescopic tube 31 can engage with the annular groove 302 in the upper inner wall of the sleeve 301, therefore the telescopic tube 31 cannot easily slip out of the sleeve 301 by a force applied improperly, thus able to prevent the broiler oven 2 and the hot food and other articles on it from dropping down and causing scalding. To sum up, the broiler oven 2 can be adjusted to a height most suitable for a user to carry out broiling conveniently, and since the fit rod 22 under the broiler oven 2 is rotatably inserted in the telescopic tube 31 of the telescopic foot frame 3, the broiler oven 2 can be turned around for 360° in using, convenient to match with a user's position or wind direction.

As can be noted from the above description, the invention has the following advantages.

1. The broiler frame is easy to be assembled, disassembled and handled, and convenient to be collapsed for storing.

2. The securing rod under the broiler oven is rotatably inserted in the telescopic tube of the telescopic foot frame so the broiler oven can be freely turned around for 360° to conform to a user's position or wind direction.

3. The broiler frame can be adjusted to a height most suitable for a user, tall or short, sitting or standing to carry out broiling.

4. The buffer gasket provided at the lower end of the telescopic tube of the telescopic foot frame enables the telescopic tube to move downward slowly and smoothly when the telescopic tube is pressed downward by the gravity of the broiler oven, convenient for a user to move the broiler oven downward and fix it in position at a proper height by means of the position bolt.

5. The sleeve of the telescopic foot frame is formed with an annular groove in the upper inner wall for the elastic stopper of the telescopic tube to be engaged therein, able to prevent the telescopic tube from slipping out of the sleeve by a force applied improperly and protect the broiler oven and the hot food on it from dropping down and causing scalding.

6. The broiler frame can be collapsed with quickness to diminish its size for storing with only a little space 7. The broiler frame is applicable to different topographies, permitting a user to carry out broiling at any location and enjoy broiling to his/her heart's content.

While the preferred embodiment of the invention has been described above, it will be recognized and understood that various modifications may be made therein and the appended claims are intended to cover all such modifications that may fall within the spirit and scope of the invention.

What is claimed is:

1. A broiler frame comprising:

a broiler oven having a securing rod fixed under its bottom;

a telescopic foot frame for said broiler oven to be rotatably mounted thereon, said telescopic foot frame composed of a collapsible foot frame and a telescopic tube, said collapsible foot frame consisting of a sleeve and a set of support tripod, said sleeve provided with a position bolt at an upper end, said telescopic tube inserted movably in said sleeve of said collapsible foot frame, said securing rod of said broiler oven rotatably inserted in an upper end of said telescopic tube; and, said broiler oven able to be turned around for 360 degrees when it is used, said telescopic foot frame able to be adjusted to a height most suitable for a user to carry out broiling;

said telescopic tube of said telescopic foot frame is provided with a buffer gasket at a lower end of the telescopic tube to permit said telescopic tube to move downward slowly and smoothly when said telescopic tube is pressed down by the gravity of said broiler oven, enabling a user to move said broiler oven downward to a proper height and fix it in position by means of said position bolt; and said sleeve is formed with an annular groove in an upper inner wall, and said telescopic tube is provided with an elastic stopper at a proper location, said elastic stopper able to engage with said annular groove to prevent said telescopic tube from slipping out of said sleeve by a force applied improperly, protecting said broiler oven and the hot food on it from dropping down and causing accidental scalding.

* * * * *